United States Patent
Liang et al.

(10) Patent No.: US 9,692,577 B2
(45) Date of Patent: Jun. 27, 2017

(54) METHOD FOR ACQUIRING CHANNEL STATE INFORMATION IN FDD MIMO WIRELESS NETWORKS

(71) Applicant: Ping Liang, Irvine, CA (US)

(72) Inventors: Ping Liang, Newport Coast, CA (US); Dengkui Zhu, Wanyuan (CN)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 15/101,949

(22) PCT Filed: Dec. 20, 2014

(86) PCT No.: PCT/US2014/071752
§ 371 (c)(1),
(2) Date: Jun. 6, 2016

(87) PCT Pub. No.: WO2015/095843
PCT Pub. Date: Jun. 25, 2015

(65) Prior Publication Data
US 2016/0315749 A1    Oct. 27, 2016

Related U.S. Application Data

(60) Provisional application No. 61/919,032, filed on Dec. 20, 2013.

(51) Int. Cl.
*H04L 12/28* (2006.01)
*H04L 5/00* (2006.01)
(Continued)

(52) U.S. Cl.
CPC .......... *H04L 5/0053* (2013.01); *H04L 5/0023* (2013.01); *H04L 5/0035* (2013.01);
(Continued)

(58) Field of Classification Search
USPC ......................... 370/252, 329, 330, 344, 430
See application file for complete search history.

(56) References Cited

U.S. PATENT DOCUMENTS

| | | |
|---|---|---|
| 5,691,978 A | 11/1997 | Kenworthy |
| 6,891,792 B1 | 5/2005 | Cimini, Jr. et al. |

(Continued)

FOREIGN PATENT DOCUMENTS

| | | |
|---|---|---|
| CN | 101193086 A | 6/2008 |
| CN | 101729112 A | 6/2010 |

(Continued)

OTHER PUBLICATIONS

WIPO, PCT/US14/65853 Search Report and Written Opinion of the International Search Authority, Published May 21, 2015.
(Continued)

*Primary Examiner* — John Pezzlo
(74) *Attorney, Agent, or Firm* — Guosheng Wang; United States Research and Patent Firm

(57) ABSTRACT

This invention presents methods and circuits for a BS to acquire DL CSI in a FDD wireless network comprising switching the normal transmitting and receiving frequencies in a first and a second FDD apparatus, and using UL pilot signals to estimate the DL CSI based on reciprocity of the over the air channels.

16 Claims, 14 Drawing Sheets

Figure 1:
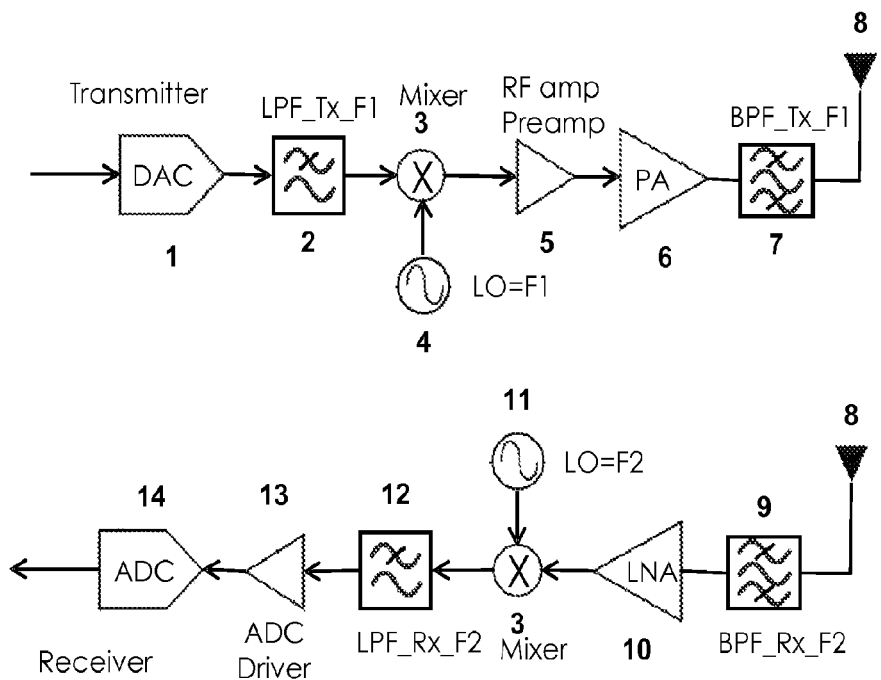
Figure 2A:
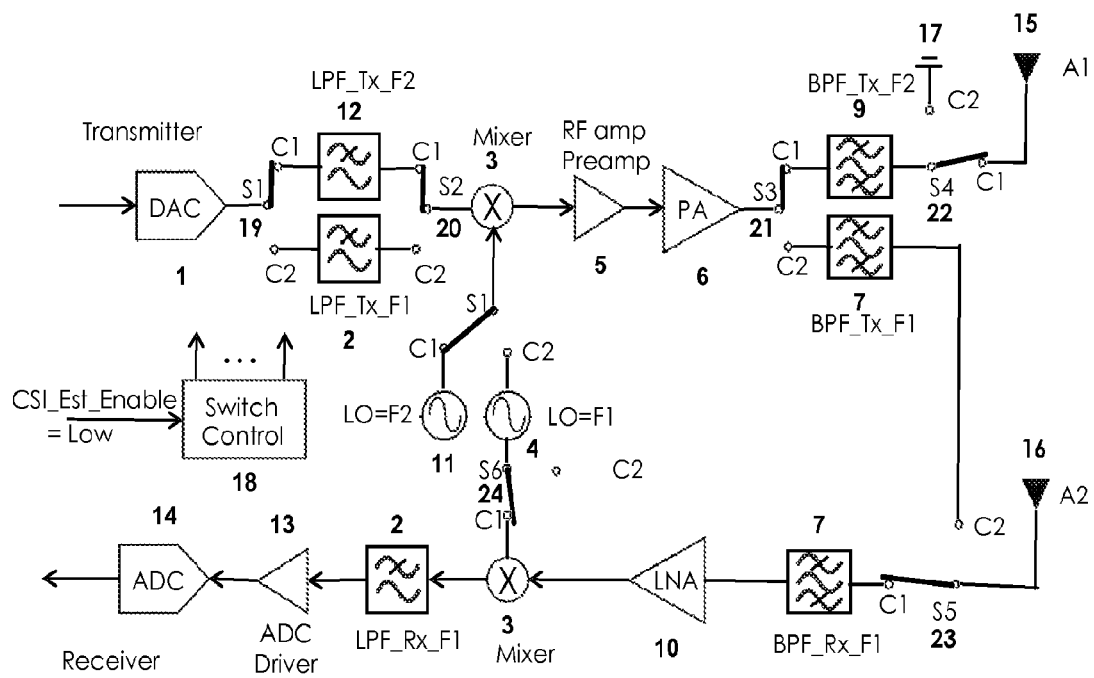
Figure 2B:
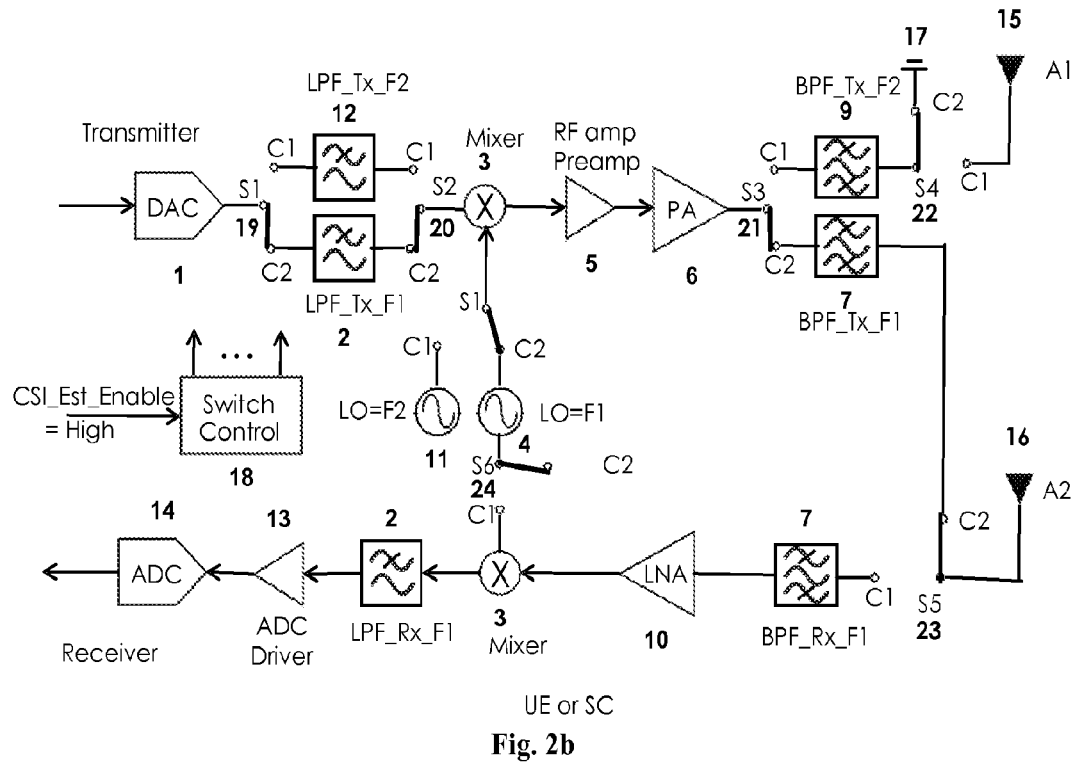

(51) Int. Cl.
*H04W 72/04* (2009.01)
*H04L 5/14* (2006.01)
*H04W 72/08* (2009.01)
*H04J 1/16* (2006.01)
*H04L 1/00* (2006.01)

(52) U.S. Cl.
CPC .......... *H04L 5/14* (2013.01); *H04W 72/0453* (2013.01); *H04W 72/085* (2013.01); *H04L 1/0026* (2013.01)

(56) References Cited

U.S. PATENT DOCUMENTS

| | | | |
|---|---|---|---|
| 7,123,676 | B2 | 10/2006 | Gebara et al. |
| 7,505,788 | B1 | 3/2009 | Narasimhan |
| 7,596,352 | B2 | 9/2009 | Ding et al. |
| 7,821,998 | B2 | 10/2010 | Jeong |
| 8,032,080 | B2 | 10/2011 | Andersson et al. |
| 8,472,383 | B1 | 6/2013 | Banerjea et al. |
| 8,559,485 | B2 | 10/2013 | Maca |
| 2003/0053488 | A1 | 3/2003 | Hoole |
| 2004/0095907 | A1 | 5/2004 | Agee et al. |
| 2005/0128993 | A1 | 6/2005 | Yu et al. |
| 2006/0039318 | A1 | 2/2006 | Oh et al. |
| 2006/0235667 | A1 | 10/2006 | Fung et al. |
| 2007/0223423 | A1 | 9/2007 | Kim et al. |
| 2007/0253476 | A1 | 11/2007 | Tirkkonen et al. |
| 2008/0095223 | A1 | 4/2008 | Tong et al. |
| 2008/0187077 | A1 | 8/2008 | Matza et al. |
| 2008/0279170 | A1 | 11/2008 | Malladi et al. |
| 2008/0304554 | A1 | 12/2008 | Fulghum et al. |
| 2008/0311939 | A1 | 12/2008 | Hugl et al. |
| 2009/0054093 | A1 | 2/2009 | Kim et al. |
| 2009/0129489 | A1 | 5/2009 | Eldar et al. |
| 2009/0175214 | A1 | 7/2009 | Sfar et al. |
| 2009/0225721 | A1 | 9/2009 | Cudak et al. |
| 2009/0316609 | A1 | 12/2009 | Singh |
| 2009/0318183 | A1 | 12/2009 | Hugl et al. |
| 2010/0008216 | A1 | 1/2010 | Li et al. |
| 2010/0128687 | A1 | 5/2010 | Oteri et al. |
| 2010/0150013 | A1 | 6/2010 | Hara et al. |
| 2010/0177717 | A1 | 7/2010 | Sung et al. |
| 2010/0246526 | A1 | 9/2010 | Jing et al. |
| 2010/0311349 | A1 | 12/2010 | Koo et al. |
| 2010/0323684 | A1 | 12/2010 | Cai et al. |
| 2010/0329375 | A1 | 12/2010 | Nakayama |
| 2011/0009105 | A1 | 1/2011 | Lee et al. |
| 2011/0080968 | A1 | 4/2011 | Seo et al. |
| 2011/0116436 | A1 | 5/2011 | Bachu et al. |
| 2011/0134859 | A1 | 6/2011 | Li et al. |
| 2011/0141941 | A1 | 6/2011 | Lee et al. |
| 2011/0211661 | A1 | 9/2011 | Valadon |
| 2011/0235602 | A1 | 9/2011 | Ji et al. |
| 2011/0310881 | A1 | 12/2011 | Kenington |
| 2012/0051265 | A1 | 3/2012 | Shen et al. |
| 2012/0057557 | A1 | 3/2012 | Prasad et al. |
| 2012/0063336 | A1 | 3/2012 | Shany et al. |
| 2012/0063426 | A1 | 3/2012 | Noh et al. |
| 2012/0133557 | A1 | 5/2012 | Beaudin |
| 2012/0140743 | A1 | 6/2012 | Reed et al. |
| 2012/0149296 | A1 | 6/2012 | Sawai |
| 2012/0176965 | A1 | 7/2012 | Zhu et al. |
| 2012/0188897 | A1* | 7/2012 | Shen .................. H04W 52/146 370/252 |
| 2012/0188899 | A1 | 7/2012 | Zhang et al. |
| 2012/0201191 | A1 | 8/2012 | Seo et al. |
| 2012/0252474 | A1 | 10/2012 | Tiirola et al. |
| 2012/0257584 | A1 | 10/2012 | Behravan et al. |
| 2012/0287900 | A1 | 11/2012 | Seo et al. |
| 2012/0294224 | A1 | 11/2012 | Silva et al. |
| 2013/0005382 | A1 | 1/2013 | Landstrom et al. |
| 2013/0022090 | A1 | 1/2013 | Weng et al. |
| 2013/0034066 | A1 | 2/2013 | Kakishima et al. |
| 2013/0044650 | A1 | 2/2013 | Barker et al. |
| 2013/0044725 | A1 | 2/2013 | Chun et al. |
| 2013/0077514 | A1 | 3/2013 | Dinan |
| 2013/0077543 | A1 | 3/2013 | Kim et al. |
| 2013/0077554 | A1 | 3/2013 | Gauvreau et al. |
| 2013/0107916 | A1 | 5/2013 | Liu et al. |
| 2013/0114468 | A1 | 5/2013 | Hui et al. |
| 2013/0114650 | A1 | 5/2013 | Li et al. |
| 2013/0163544 | A1 | 6/2013 | Lee et al. |
| 2013/0194931 | A1 | 8/2013 | Lee et al. |
| 2013/0208608 | A1 | 8/2013 | Piazza et al. |
| 2013/0242720 | A1 | 9/2013 | Chou |
| 2013/0265972 | A1 | 10/2013 | Shirani-Mehr et al. |
| 2013/0287131 | A1 | 10/2013 | Hart et al. |
| 2013/0301487 | A1 | 11/2013 | Khandani |
| 2017/0054480 | A1* | 2/2017 | Shattil .................. H04B 7/0452 |
| 2017/0054482 | A1* | 2/2017 | Forenza ............... H04B 7/0456 |
| 2017/0126458 | A1* | 5/2017 | Shattil ................ H04L 27/2628 |

FOREIGN PATENT DOCUMENTS

| | | |
|---|---|---|
| CN | 102598537 A | 7/2012 |
| CN | 102742311 A | 10/2012 |
| CN | 102918707 A | 2/2013 |
| EP | 1703686 A1 | 9/2006 |
| EP | 2648342 A1 | 10/2013 |
| WO | WO03021902 A1 | 3/2003 |
| WO | WO2006112030 A1 | 10/2006 |
| WO | WO2009154352 A2 | 12/2009 |
| WO | WO2012130371 A1 | 10/2012 |

OTHER PUBLICATIONS

WIPO, PCT/US14/71753 Search Report and Written Opinion of the International Search Authority, Published Jun. 25, 2015.
WIPO, PCT/US14/71752 Search Report and Written Opinion of the International Search Authority, Published Jun. 25, 2015.
WIPO, PCT/US15/52386 Search Report and Written Opinion of the International Search Authority, Published Mar. 31, 2016.
WIPO, PCT/US15/56500 Search Report and Written Opinion of the International Search Authority, Published Apr. 28, 2016.
WIPO, PCT/US16/13743 Search Report and Written Opinion of the International Search Authority.
WIPO, PCT/US16/13744 Search Report and Written Opinion of the International Search Authority.
WIPO, PCT/US16/13750 Search Report and Written Opinion of the International Search Authority.
WIPO, PCT/US16/13752 Search Report and Written Opinion of the International Search Authority.
John H. Conway; Ronald H. Hardin, and Neil J. A. Sloane, Packing lines, planes, etc.: packings in Grassmannian spaces, Experimental Mathematics, 1996, 139-159, vol. 5, issue 2.
B. Rankov; A. Wittneben, On the Capacity of Relay-Assisted Wireless MIMO Channels, Fifth IEEE Workshop on Signal Processing Advances in Wireless Communications, Jul. 11-14, 2004, 323-327, IEEE, Lisboa, Portugal.
Xinying Zhang; A. F. Molisch; Sun-Yuan Kung, Variable-phase-shift-base RF-baseband codesign for MIMO antenna selection, IEEE Transactions on Signal Processing, Nov. 2005, 4091-4103, vol. 53, issue 11, IEEE.
Robert M. Gray, Toeplitz and Circulant Matrices: A Review, Foundations and Trends in Communications and Information Theory, Jan. 31, 2006, 155-239, vol. 2, issue 3.
Qualcomm Europe, [R1-080494] Calibration procedures for TDD beamforming, 3GPP TSG RAN WG1 #51bis meeting, Jan. 14-18, 2008, 3GPP, Sevilla, Spain.
Chan-Byoung Chae; Taiwen Tang; Robert W. Heath Jr.; Sunghyun Cho, MIMO Relaying With Linear Processing for Multiuser Transmission in Fixed Relay Networks, IEEE Transactions on Signal Processing, Feb. 2008, 727-738, vol. 56, issue 2, IEEE.
Marek E. Bialkowski; Feng-Chi E. Tsai; Yu-Chuan Su; Kai-Hong Cheng, Design of fully integrated 4x4 and 8x8 Butler matrices in microstrip/slot technology for ultra wideband smart antennas, 2008 IEEE Antennas and Propagation Society International Symposium, Jul. 1-4, 2008, IEEE, San Diego, CA, USA.

(56) References Cited

OTHER PUBLICATIONS

Xiaolin Hou; Zhan Zhang; Hidetoshi Kayama, DMRS Design and Channel Estimation for LTE-Advanced MIMO Uplink, Vehicular Technology Conference Fall (VTC 2009—Fall), 2009 IEEE 70th, Sep. 1-5, 2009, IEEE, Anchorage, AK.

ITU-R M.2135-1, Guidelines for evaluation of radio interface technologies for IMT-advanced, International Communication Union (ITU), Dec. 2009, ITU.

Wei Xu; Xiaodai Dong, Limited feedback design for MIMO-relay assisted cellular networks with beamforming, 2010 IEEE International Symposium on Information Theory, Jun. 13-18, 2010, 2348-2352, IEEE, Austin, Texas, USA.

Vijay Venkateswaran; Alle-Jan van der Veen, Analog Beamforming in MIMO communication Shift Networks and Online Channel Estimation, IEEE Transactions on Signal Processing, Aug. 2010, 4131-4143, vol. 58, issue 8, IEEE.

3GPP TR 36.814, 3rd Generation Partnership Project; Technical Specification Group Radio Access Network; Evolved Universal Terrestrial Radio Access (E-TURA); Further advancements for E-UTRA physical layer aspects (Release 9), 3GPP, Oct. 2010, version v9.0.0, 3GPP.

Thomas L. Marzetta, Noncooperative Cellular Wireless with Unlimited Numbers of Base Station Antennas, IEEE Transactions on Wireless Communications, Nov. 2010, 3590-3600, vol. 9, issue 11, IEEE.

Y. Ming Tsang; Ada S. Y. Poon; Sateesh Addepalli, Coding the Beams: Improving Beamforming Training in mmWaveCommunication System, IEEE Global Telecommunications Conference (GLOBECOM 2011), Dec. 1-6, 2011, IEEE, Houston, Texas, USA.

Junyoung Nam; Jae-Young Ahn; Ansuman Adhikary; Giuseppe Caire, Joint spatial division and multiplexing: Realizing massive MIMO gains with limited channel state information, Information Sciences and Systems (CISS), 2012 46th Annual Conference on , Mar. 1-6, 2012, IEEE, Princeton, NJ, USA.

Noon Huh; Antonia M. Tulino; Giuseppe Caire, Network MIMO With Linear Zero-Forcing Beamforming: Large System Analysis, Impact of Channel Estimation, and Reduced-Complexity Scheduling, IEEE Transactions on Information Theory, May 2012, 2911-2934, vol. 58, issue 5, IEEE.

W.L. Stutzman and G.A. Thiele, Antenna Theory and Design, 3rd edition, May 2012, 1-848, Wiley.

Clayton Shepard; Hang Yu; Narendra Anand; Li Erran Li; Thomas Marzetta; Richard Yang; Lin Zhong, Argos: Practical Many-Antenna Base Stations, Proceedings of the 18th annual international conference on Mobile computing and networking (Mobicom '12), Aug. 22-26, 2012, 53-64, ACM, Istanbul, Turkey.

Yingbo Hua; Ping Liang; Yiming Ma; Ali Cagatay Cirik; Qian Gao, A Method for Broadband Full-Duplex MIMO Radio, IEEE Signal Processing Letters, Oct. 2012, 793-796, vol. 19, issue 12, IEEE.

Theodore S. Rappaport; Shu Sun; Rimma Mayzus; Hang Zhao; Yaniv Azar;Kevin Wang; George N. Wong; Jocelyn K. Schulz; Mathew Samimi; Felix Gutierrez, Millimeter Wave Mobile Communications for 5G Cellular: It Will Work!, IEEE Access, 2013, 335-349, vol. 1, IEEE.

Fredrik Rusek; Daniel Persson; Buon Kiong Lau; Erik G. Larsson; Thomas L. Marzetta; Ove Edfors; Fredrik Tufvesson, Scaling Up MIMO: Opportunities and Challenges with Very Large Arrays, IEEE Signal Processing Magazine , Jan. 2013, 40-60, vol. 30 , issue 1, IEEE—Institute of Electrical and Electronics Engineers Inc.

Ansuman Adhikary; Junyoung Nam; Jae-Young Ahn; Giuseppe Caire, Joint Spatial Division and Multiplexing, arXiv, Jan. 2013, vol. abs/1209.1402v2, [online], http://arxiv.org/abs/1209.1402.

Jakob Hoydis; Stephan Ten Brink; Merouane Debbah, Massive MIMO in the UL/DL of Cellular Networks: How Many Antennas Do We Need?, IEEE Journal on Selected Areas in Communications, Feb. 2013, 160-171, vol. 31, issue 2, IEEE.

3GPP TS 36.211, 3rd Generation Partnership Project; Technical Specification Group Radio Access Network; Evolved Universal Terrestrial Radio Access (E-TURA); Physical Channels and Modulation (Release 12), 3GPP, Mar. 2013, version v12.1.0, 3GPP.

Hemanth Prabhu; Joachim Rodrigues; Ove Edfors; Fredrik Rusek, Approximative matrix inverse computations for very-large MIMO and applications to linear pre-coding systems, 2013 IEEE Wireless Communications and Networking Conference (WCNC), Apr. 2013, 2710-2715, IEEE, Shanghai, China.

3GPP TS 36.104, 3rd Generation Partnership Project; Technical Specification Group Radio Access Network; Evolved Universal Terrestrial Radio Access (E-TURA); Base Station (BS) Radio Transmission and Reception (Release 12), 3GPP, Jun. 2013, version v12.4.0, 3GPP.

Dinesh Bharadia; Emily McMilin; Sachin Katti, Full Duplex Radios, Proceedings of the ACM SIGCOMM 2013 (SIGCOMM '13), Aug. 12-16, 2013, 375-386, hongkong, China.

Sooyoung Hur; Taejoon Kim; David J. Love; James V. Krogmeier; Tiomthy A. Thomas; Amitava Ghosh, Millimeter Wave Beamforming for Wireless Backhaul and Access in Small Cell Networks, IEEE Transactions on Communications, Oct. 2013, 4391-4403, vol. 61, issue 10, IEEE.

Akbar Sayeed; John Brady, Beamspace MIMO for high-dimensional Multiuser Communication at millimeter-wave Frequencies, 2013 IEEE Global Communications Conference (GLOBECOM), Dec. 2013, 3679-3684, IEEE, Atlanta, GA.

Guanbo Zheng; Cunqing Hua; Rong Zheng; Qixin Wang, A robust relay placement framework for 60GHz mmWave wireless personal area networks, 2013 IEEE Global Communications Conference (GLOBECOM), Dec. 2013, 4816-4822, IEEE, Atlanta, GA.

WIPO, PCT/US16/39684 Search Report and Written Opinion of the International Search Authority.

WIPO, PCT/US16/41668 Search Report and Written Opinion of the International Search Authority.

WIPO, PCT/US16/37625 Search Report and Written Opinion of the International Search Authority.

WIPO, PCT/US16/30862 Search Report and Written Opinion of the International Search Authority.

WIPO, PCT/US16/27007 Search Report and Written Opinion of the International Search Authority.

WIPO, PCT/US16/13742 Search Report and Written Opinion of the International Search Authority.

Taneli Riihonen; Stefan Werner; Risto Wichman, Hypoexponential Power-Delay Profile and Performance of Multihop OFDM Relay Links, IEEE Transactions on Wireless Communication, Dec. 2010, 3878-3888, vol. 9, issue 12, IEEE.

Office Action from Chinese Patent Office dated Oct. 27, 2016 in Chinese Patent Application No. 201480062324.6.

European Patent Search Report dated Dec. 1, 2016 in EP 14870824.

OfficeAction from Chinese Patent Office dated Nov. 16, 2016 in Chinese PatentApplication No. 201480069052.2.

\* cited by examiner

Base Station or SC

UE or SC

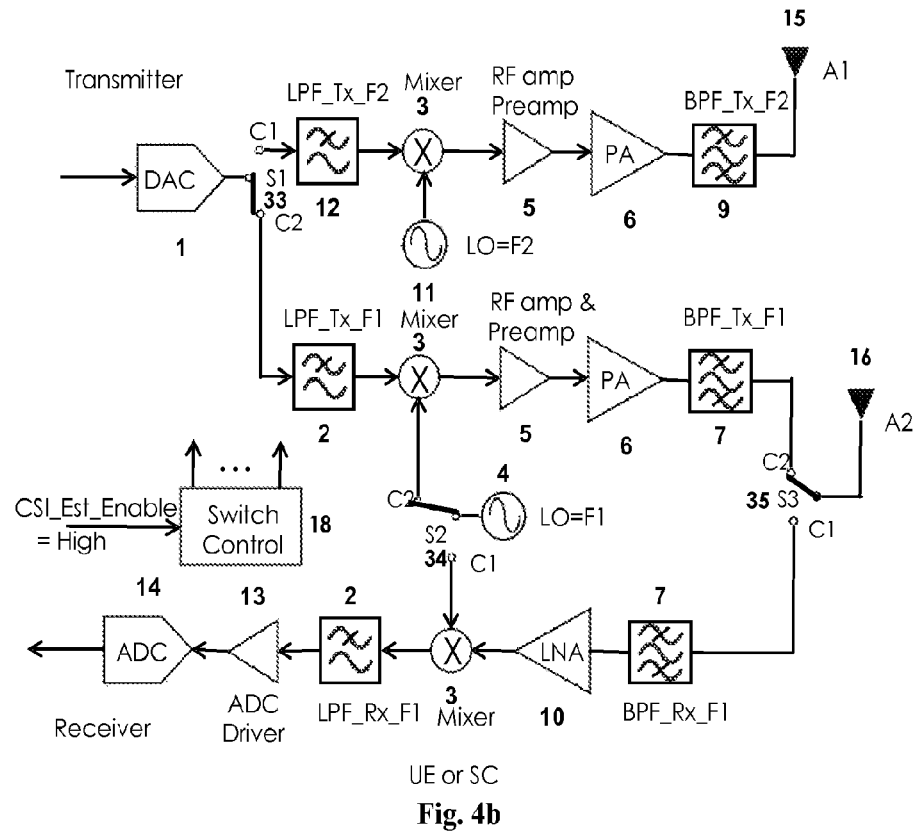

METHOD FOR ACQUIRING CHANNEL STATE INFORMATION IN FDD MIMO WIRELESS NETWORKS

This application claims the benefit of U.S. Provisional Application No. 61/919,032, filed on Dec. 20, 2013.

FIELD OF THE INVENTION

The present application relates to methods for acquiring Channel State Information (CSI) in a wireless network and to apparatus and systems that implement the methods, and more specifically to methods and related apparatus and systems for acquiring CSI in a Frequency-Division Duplexing (FDD) wireless network for beamforming or joint transmission using multiple antennas.

BACKGROUND

Massive Multiple-Input Multiple-Output Multi-User beamforming (MM-MUBF) offers the potential to significantly increase the spectral efficiency and throughput by many folds through spatial multiplexing, providing linear capacity growth without the need of increasing spectral bandwidth. However, when the number of RF chains and antennas becomes large (It is understood that an antenna is associated with a RF chain, transmitting (Tx) or receiving (Rx), thus, hereafter when the number of antennas is used, it should be understood to mean the number of antennas and the associated RF chains), there is significant overhead in channel estimation to obtain the CSI. For a Base Station (BS) with a large number of antennas, e.g., N antennas, to simultaneously Beam Form (BF) to multiple receivers, e.g., K User Equipment (UEs) and/or Small Cells (SCs) which depend on a BS to provide wireless backhaul, the BS transmitters must know the CSI of the NxK channels, where N>>K. To be precise, it is the CSI between N BS antennas and the total number of antennas on the K UEs and/or SCs. To simplify discussion, without loss of generality, we assume the total number of receiving antennas is K.

For this reason, prior art on massive MIMO systems focused on the Time-Division Duplexing (TDD) mode [1] because the transmitter can get the CSI of the receiver using channel reciprocity, which allows a BS to estimate its downlink (DL) channels from uplink (UL) pilots sent by the receivers, i.e., UEs and/or SCs. The overhead for estimating the DL CSI increases linearly with the number of receivers, K, and is independent of the number of antennas, N, which is much larger than K. In prior art of massive MIMO using the FDD mode, all N transmitters on the BS need to send pilots, separated in frequency or time, to the K receivers, which need to feedback the DL CSI to the BS. The overhead in sending the DL pilots scales linearly with N, the number of antennas on the BS, which can be a very large number, and the feedback of the DL CSI to the BS scales linearly with K, the number of receiving antennas. One prior art work [2] showed that for typical coherence block length, Multi-User MIMO (MU-MIMO) in FDD systems cannot afford a large number of BS antennas, otherwise the training and feedback overhead consumes the whole system throughput. Another prior work by the same authors [3] argued that the difficulty of using massive MIMO in FDD can be alleviated to some extent by Joint Spatial Division and Multiplexing (JSDM), which partitions the user population into groups that have similar transmitting correlation matrices and induce as small inter-group interference as possible by the user location geometry. However, these conditions may not be met and the overhead is still higher than in the TDD mode when they are met.

The challenge of CSI feedback in FDD networks is not limited to massive MU-MIMO. Coordinated Multi-Point transmission/reception (CoMP) in an FDD LTE network requires CSI estimation and feedback of channels in the CoMP measurement set, leading to much larger overhead than TDD network, especially for joint transmission and coordinated beamforming, because of lack of channel reciprocity.

This invention presents embodiments that solve the technical challenges discussed above for massive MIMO in FDD wireless communication.

DETAILED DESCRIPTION OF THE PRESENT INVENTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block represents a method step or an apparatus element for performing the method step. Depending upon the implementation, the corresponding apparatus element may be configured in hardware, software, firmware or combinations thereof.

FIG. 1 shows the general principle circuit of a prior art FDD apparatus that uses a first frequency band for transmitting and a second frequency band for receiving. Specifically, the transmitting path includes a Digital-to-Analog Converter (DAC) 1, a Low Pass Filter (LPF) for the first frequency band 2, a mixer 3, a Local Oscillator (LO) with the first frequency band 4, a Radio Frequency (RF) preamplifier 5, a Power Amplifier (PA) 6, a Band Pass filter (BPF) for the first frequency band 7, and an antenna 8 for transmitting, and the receiving path includes an antenna 8 for receiving, a BPF for the second frequency band 9, a Low-Noise Amplifier (LNA) 10, a mixer 3, a LO with the second frequency band 11, a LPF for the second frequency band 12, an Analog-Digital Converter (ADC) driver 13, and a ADC 14. Note that this circuit illustrates the working principle and assumes direct conversion. A person skilled in the art understands variations can be made and further details omitted here can be added in actual implementations without changing the working principle, e.g., the location and number of amplifiers, LPFs and BPFs. For the purpose of illustration, the figures show only one modulation path, which can be understood as a component in a Quadrature (IQ) modulation, e.g., in-phase or quadrature. It is straightforward to add the other quadrature component to the figures with a 90 degree phase shift of the LO. Furthermore, the first frequency band for transmitting and a second frequency band for receiving may each comprise a set of frequency bands as used in carrier aggregation. Hereafter, for simplicity of presentation, the description of the embodiments will use a single frequency band for each case but it can be easily generalized to each band being an aggregation of two or more carrier bands by a person skilled in the art based on the embodiments of this invention.

This invention provides an efficient method for acquiring DL CSI in a FDD wireless network, or the apparatus that implement this method, as illustrated in FIGS. 2 to 5. The embodiment for a first FDD apparatus (e.g., a UE, or a SC receiving a wireless backhaul connection from a BS) whose DL CSI is to be estimated is shown in FIGS. 2a and 2b, whereas DL is defined as the first FDD apparatus receiving signals in a first frequency band (as shown in FIGS. 2a and 2b with a carrier frequency of F1) from another FDD apparatus (e.g., a BS or a SC sending DL data to the first FDD apparatus), comprising one or more transmitter(s) with a normal transmitting frequency band with a carrier frequency of F2 and one or more normal transmitting antenna(s); one or more receiver(s) with a normal receiving frequency band with a carrier frequency of F1 and one or more normal receiving antenna(s); a CSI estimation enabling control signal, e.g., CSI_Est_Enable, controlled by a switch controller 18; a set of switches controlled by the CSI estimation enabling control signal; and upon the CSI estimation enabling control signal becoming active, changing the connections of the set of switches so that the transmitting frequency band of a transmitter in the first FDD apparatus is changed from its normal transmitting frequency band with a carrier frequency of F2 to its normal receiving frequency band with a carrier frequency of F1 and the transmitting signal is transmitted out of a normal receiving antenna 16 instead of a normal transmitting antenna 15. FIG. 2a shows one transmitter and one receiver circuit of a first FDD apparatus and the switch settings in its normal FDD operation mode when the CSI estimation enabling control signal is not active, while FIG. 2b shows the same transmitter and receiver circuit and the switch settings of the first FDD apparatus when the CSI estimation enabling control signal is active. As can be seen, when the CSI estimation enabling control signal is not active, e.g., CSI_Est_Enable=Low, the switches S1 19, S2 20, S3 21, S4 22, S5 23, and S6 24 are all in the C1 position and the transmitter and receiver operates in its normal FDD state, like in a prior art FDD apparatus. When the CSI estimation enabling control signal is active, e.g., CSI_Est_Enable=High, it causes switches S1 to S6 to move to the C2 position. Note that in this state S4 22 is connected to the ground 17. In the C2 position, the transmitter circuit now operates in the normal receiving frequency band with a carrier frequency of F1 and the RF signal from the power amplifier PA 6 is routed to a normal receiving antenna A2 16, which now functions as a transmitting antenna to establish channel reciprocity with a second FDD apparatus. Thus, when the control signal CSI_Est_Enable=High, the newly configured transmitting path can be used to transmit pilot signals to a second FDD apparatus in the F1 band for DL CSI estimation.

Figure 3A:
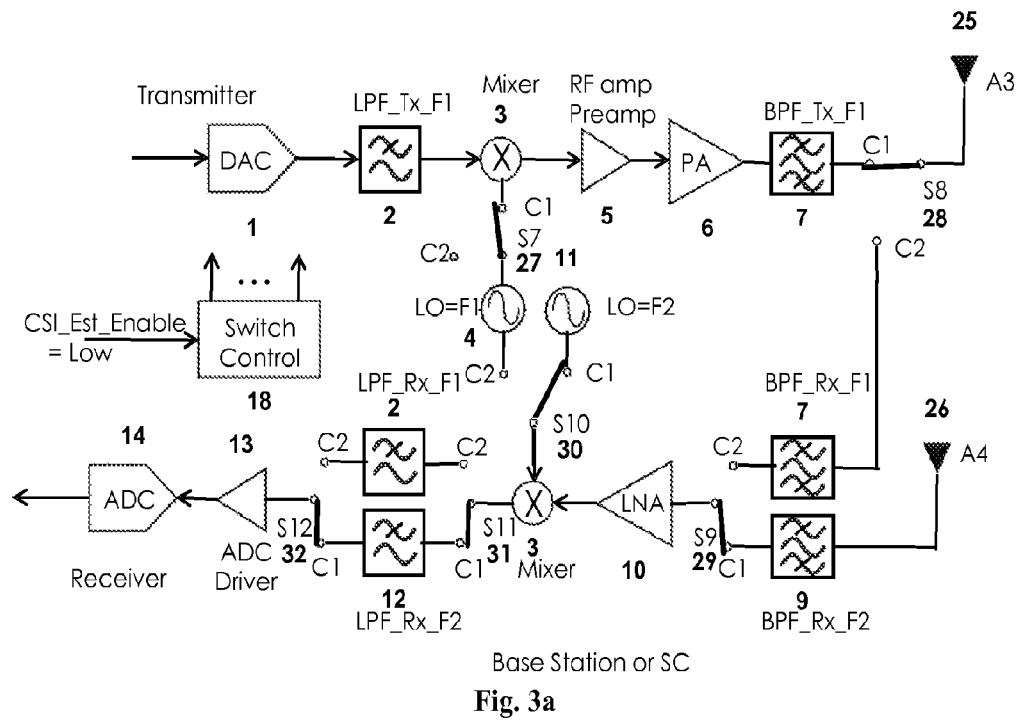
Figure 3B:
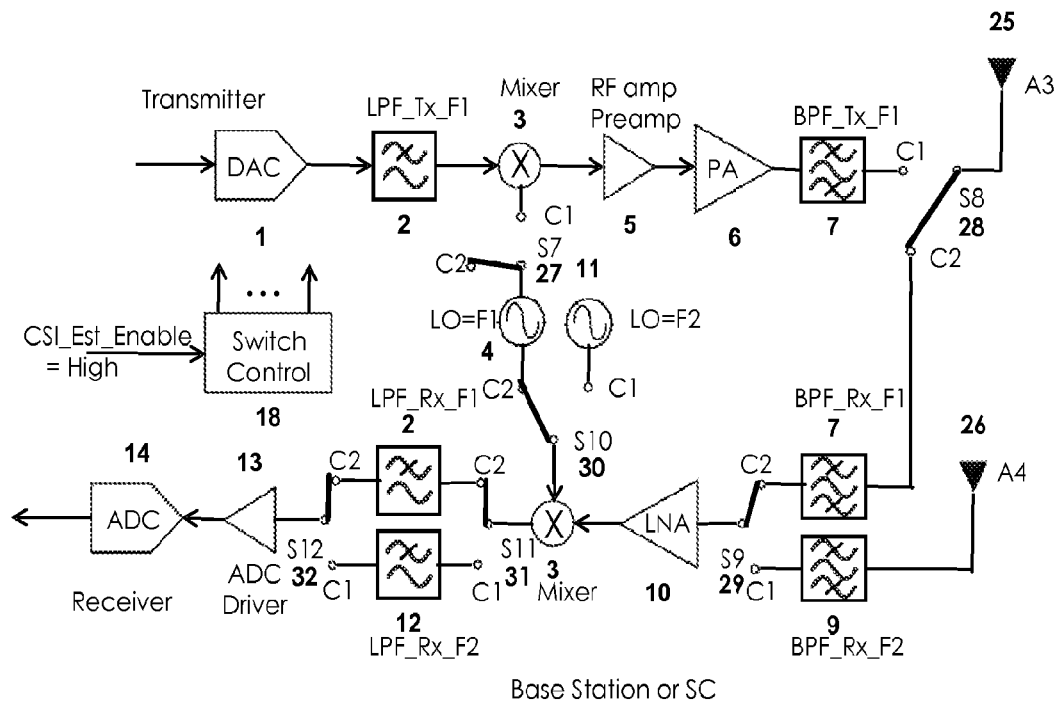

The embodiment for a second FDD apparatus (e.g., a BS or a SC sending DL data to a corresponding first FDD apparatus) whose DL CSI is to be estimated is shown in FIGS. 3a and 3b, comprising one or more transmitters (typically a large number of transmitters for a massive MIMO system) with a normal transmitting frequency band with a carrier frequency of F1 and one or more normal transmitting antennas; one or more receivers with a normal receiving frequency band with a carrier frequency of F2 and one or more normal receiving antenna(s); a CSI estimation enabling control signal, e.g., CSI_Est_Enable; a set of switches controlled by the CSI estimation enabling control signal; and upon the CSI estimation enabling control signal becoming active, changing the connections of the set of switches so that the receiving frequency band of a receiver in the second FDD apparatus is changed from its normal receiving frequency band with a carrier frequency of F2 to its normal transmitting frequency band with a carrier frequency of F1, and the signal transmitted by a first FDD apparatus (when the CSI estimation enabling control signal is active in a corresponding first FDD apparatus) is received by a normal transmitting antenna 25 instead of a normal receiving antenna 26. The signal received by a normal transmitting antenna is routed by the switches S8 28 to a receiver circuit configured by switches S9 29, S10 30, S11 31, and S12 32 to operate in the F1 band for estimation of the DL CSI with the first FDD apparatus based on channel reciprocity. FIG. 3a shows one transmitter and one receiver circuit of a second FDD apparatus and the switch settings in its normal FDD operation mode when the CSI estimation enabling control signal is not active, e.g., CSI_Est_Enable=Low, while FIG. 3b shows the same transmitter and receiver circuit and the switch settings of a second FDD apparatus when the CSI estimation enabling control signal is active, e.g., CSI_Est_Enable=High. As can be seen, when the CSI estimation enabling control signal is not active, the switches S7 27 to S12 32 are all in the C1 position and the transmitter and receiver operates in its normal FDD mode like a prior art second FDD apparatus. When the CSI estimation enabling control signal is active, it causes switches S7 27 to S12 32 to move to the C2 position. In the C2 position, the receiver circuit now operates in the normal transmitting frequency band with a carrier frequency of F1 and receives the RF signal from a normal transmitting antenna A3 25 to complete the establishment of channel reciprocity with the first FDD apparatus. Thus, when the control signal CSI_Est_Enable=High, the newly configured receiving path can be used to receive pilot signals from a first FDD apparatus in the F1 band for DL CSI estimation.

Figure 4A:
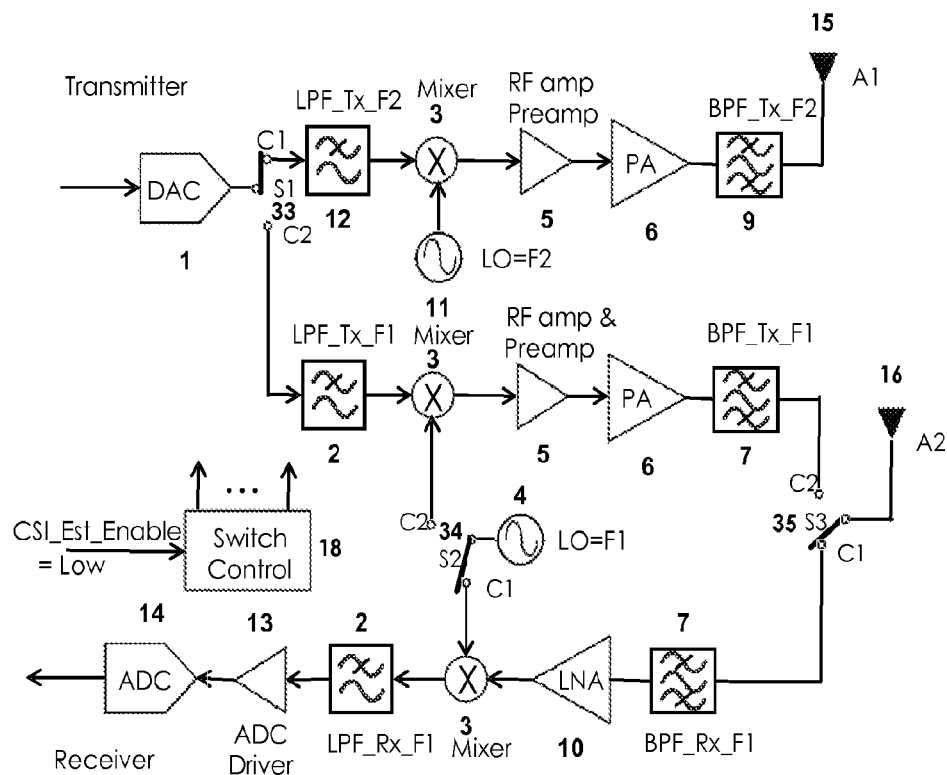

The embodiments in FIGS. 2 and 3 assume that the amplifiers and mixers can work in both the F1 band and the F2 band. Sharing as many components between the switched RF paths is preferred as it lowers the cost. FIG. 4 shows an embodiment of a first FDD apparatus that uses a transmitting path for DL CSI estimation that is separate from the normal FDD transmitting path. Switches S1 33, S2 34, and S3 35 change the transmitting path and antenna based on the CSI estimation enabling control signal. FIG. 4a shows the setting when CSI_Est_Enable=Low and FIG. 4b shows the setting when CSI_Est_Enable=High. The DAC 1 is still shared by the two transmitting paths as it is from digital to analog baseband. Separate DACs may be used for each path as well if necessary.

Figure 5B:
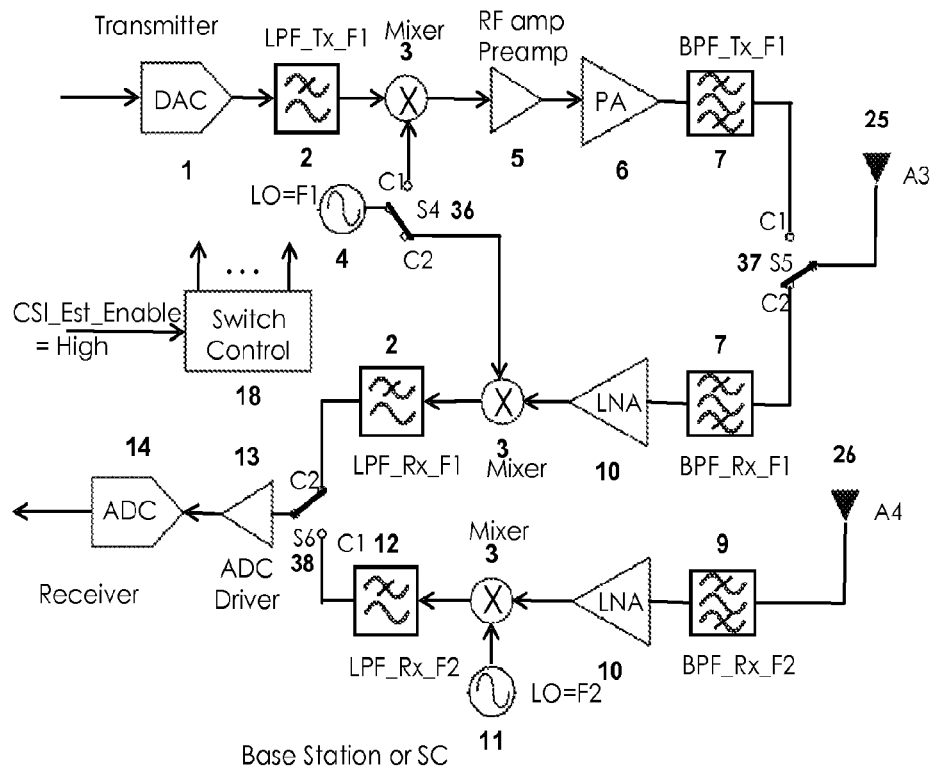

FIG. 5 shows an embodiment of a second FDD apparatus that uses a receiving path for DL CSI estimation that is separate from the normal FDD receiving path. Switches S4 36, S5 37, and S6 38 change the transmitting path and antenna based on the CSI estimation enabling control signal. FIG. 5a shows the setting when CSI_Est_Enable=Low and FIG. 5b shows the setting when CSI_Est_Enable=High. The ADC driver 13 and ADC 14 are still shared by the two receiving paths as the signal is in baseband after the LPF. Separate ADC drivers and ADCs may be used for each path as well if necessary.

Figure 6A:
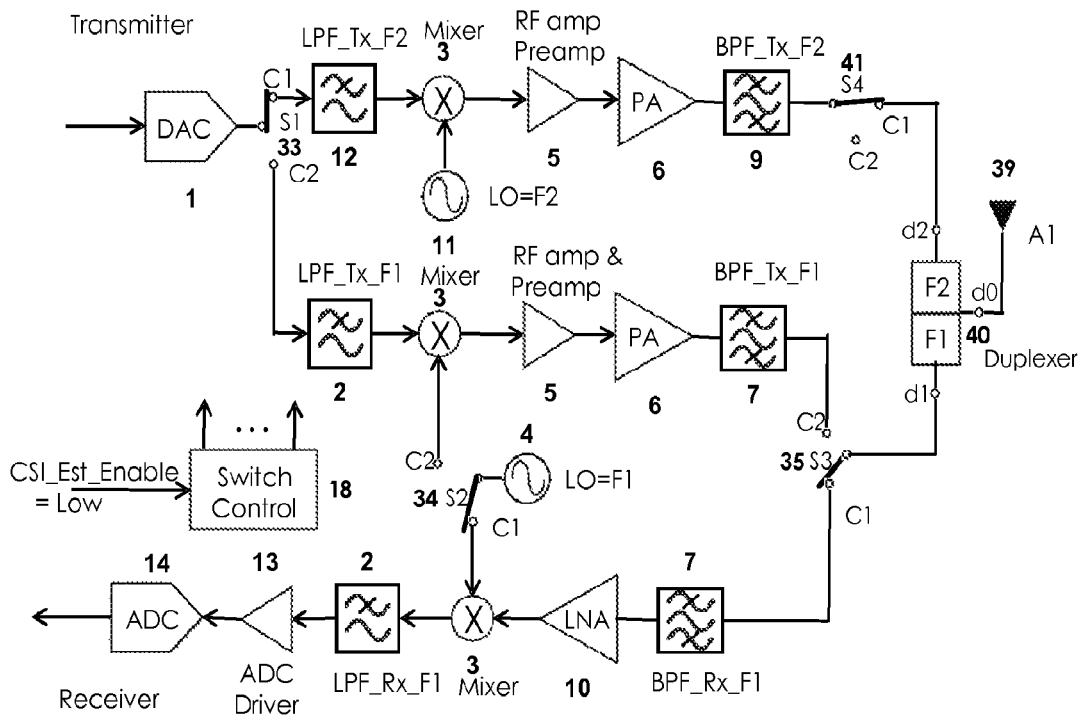
Figures 6B, 6C:
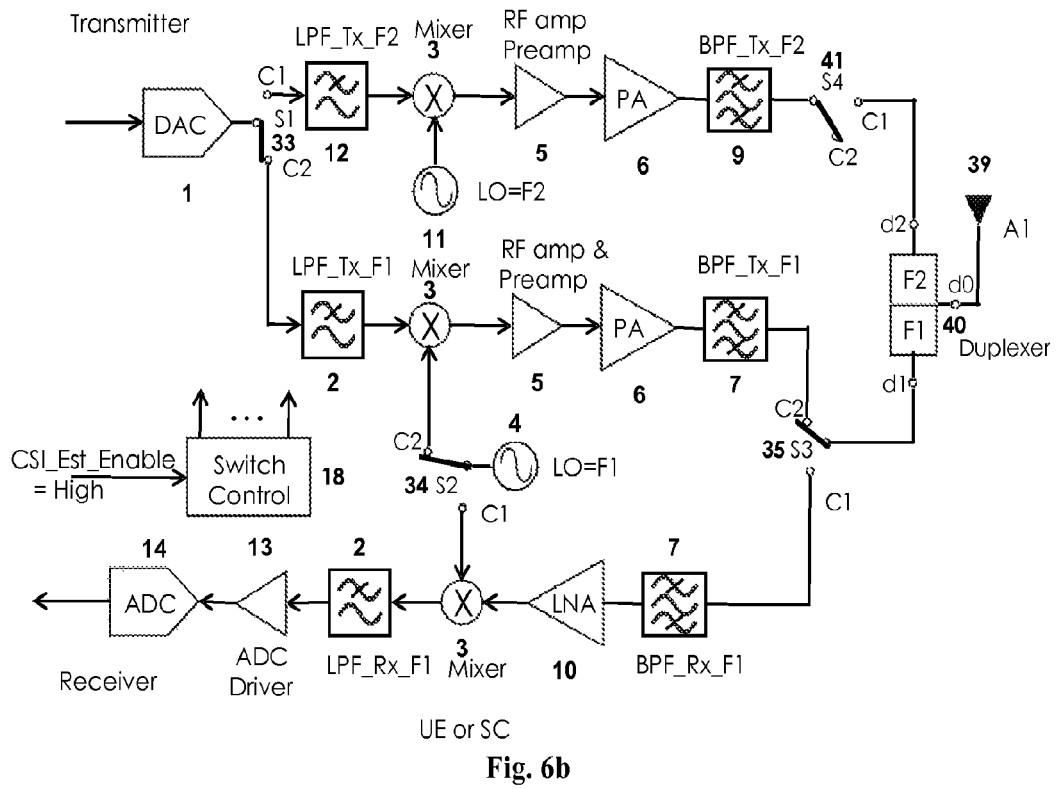

FDD apparatus often uses a signal antenna with a duplexer for both transmitting and receiving. Modification of the embodiment of a first FDD apparatus in FIG. 4 to the case when a duplexer 40 and a single antenna 39 are used for a transmitter and a receiver is shown in FIG. 6. As shown in FIG. 6, a duplexer 40 isolates the transmitting signal from reaching the receiving path, which lets signals in the F1 band to pass through the path between points d0 and d1, and lets signals in the F2 band to pass through the path between points d0 and d2. FIG. 6a shows the normal FDD operation state with switches S1 33, S2 34, S3 35, and S4 41 in C1 position, the transmitting path works in the F2 band and the receiving path works in the F1 band. FIG. 6b shows the CSI estimation configuration when CSI_Est_Enable is active and causes the switches to connect to the C2 position. An UE or CS in this state can then transmit a pilot signal in the F1 band to a second FDD apparatus through the duplexer 40 from the d1 to d0 path to the antenna 39.

Figure 6D:
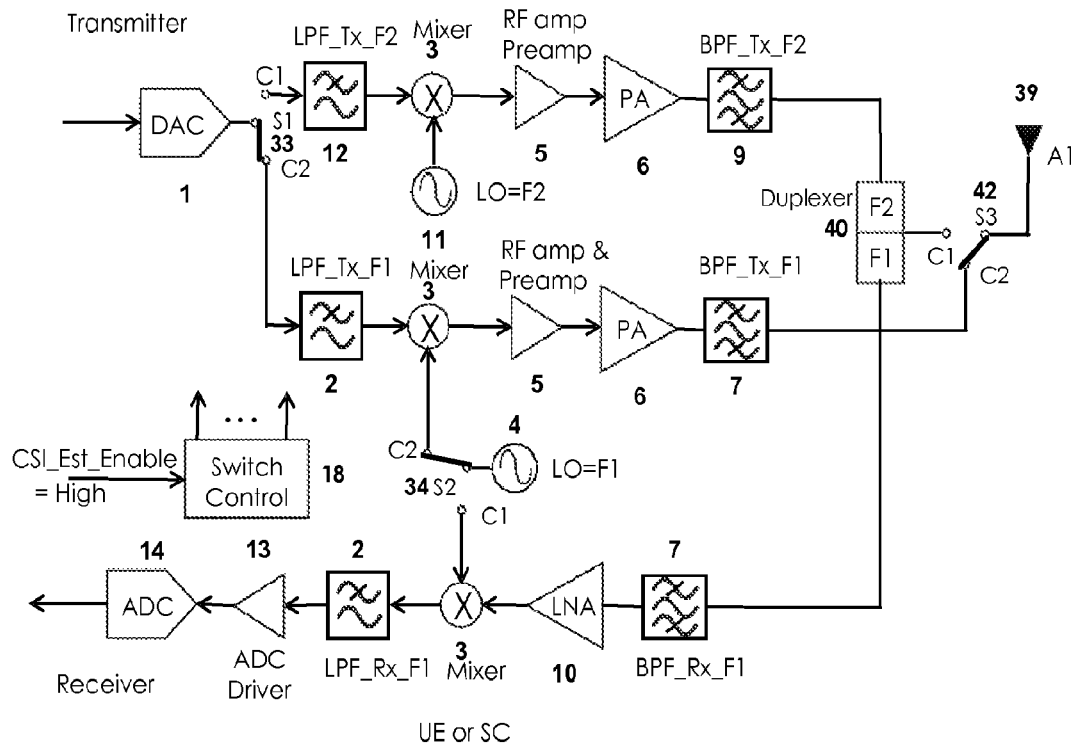

In some cases, the duplexer 40 in the F1 band is designed for low power and may not be able to sustain the transmitting power. In another embodiment, the antenna is connected to the duplexer 40 in normal FDD operation mode as shown in FIG. 6c, but is connected directly to the transmitting path in the F1 band when CSI_Est_Enable=High with the switch S3 42 as shown in FIG. 6d. This embodiment is particularly useful if the power rating or the frequency band response requirement of the path between the d0 and d1 points (used for receiving and typically low power) do not meet the requirement of transmitting power or passband of the transmitted pilot signal from the transmitting path in the F1 band (the transmitting path in the middle in FIG. 6) for DL CSI estimation.

The embodiment in FIG. 2 can be similarly modified into an embodiment of a first FDD apparatus when a duplexer and a single antenna are used for a transmitter and a receiver.

Figure 7A:
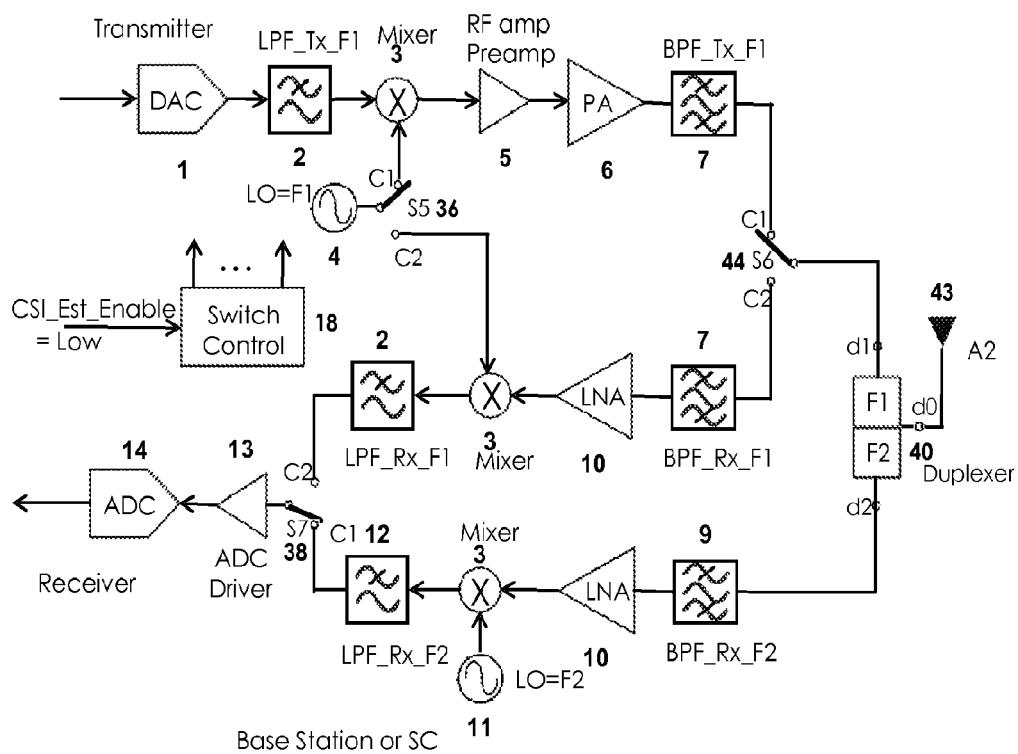
Figures 7B, 7C:
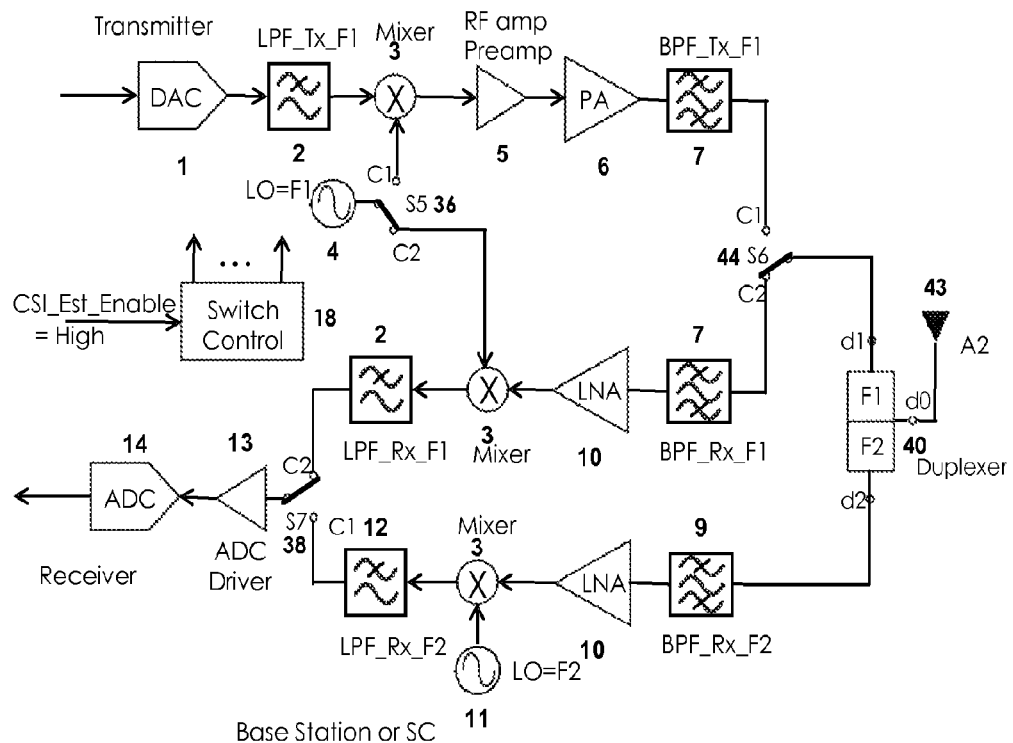

Modification of the embodiment of a second FDD apparatus in FIG. 5 to a case when a duplexer and a single antenna are used for a transmitter and a receiver is shown in FIG. 7. As shown in FIG. 7, a duplexer 40 isolates the transmitting signal from reaching the receiving path, which lets signals in the F1 band to pass through the path between points d0 and d1, and lets signals in the F2 band to pass through the path between points d0 and d2. FIG. 7a shows the normal FDD operation state with switches S5 36, S6 44, and S7 38 in C1 position, the transmitting path works in the F1 band and the receiving path works in the F2 band. FIG. 7b shows the CSI estimation configuration when CSI_Est_Enable is active and causes the switches to connect to the C2 position. A BS or CS in this state can then receive a pilot signal in the F1 band from a first FDD apparatus through the antenna 43 and the duplexer 40 from the d0 to d1 path.

Figure 7D:
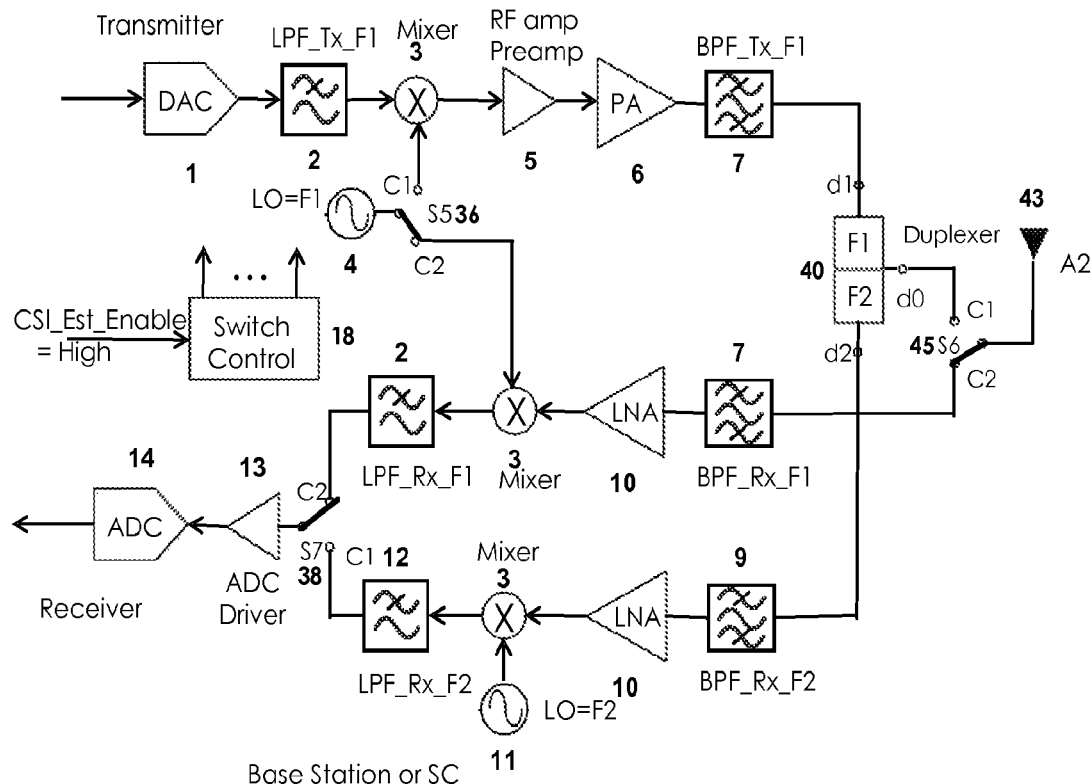

In another embodiment, the antenna is connected to the duplexer in normal FDD operation mode as shown in FIG. 7c, but is connected directly to the receiving path in the F1 band when CSI_Est_Enable=High with a switch S6 45 as shown in FIG. 7d. This embodiment is symmetric to the case of a first FDD apparatus in FIG. 6d and is particularly useful if the frequency band response requirement of the path between the d0 and d1 points do not meet the requirement of transmitting power or passband of the transmitted pilot signal from the first FDD apparatus configured in the DL CSI estimation state (when CSI_Est_Enable=High).

The embodiment in FIG. 3 can be similarly modified into an embodiment of a second FDD apparatus when a duplexer and a single antenna are used for a transmitter and a receiver.

Figure 8A:
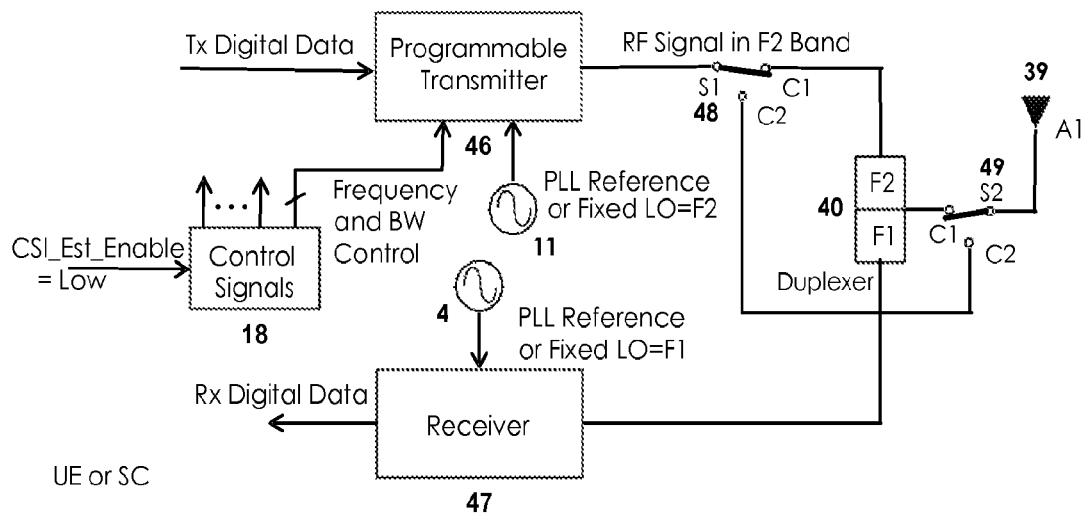
Figure 8B:
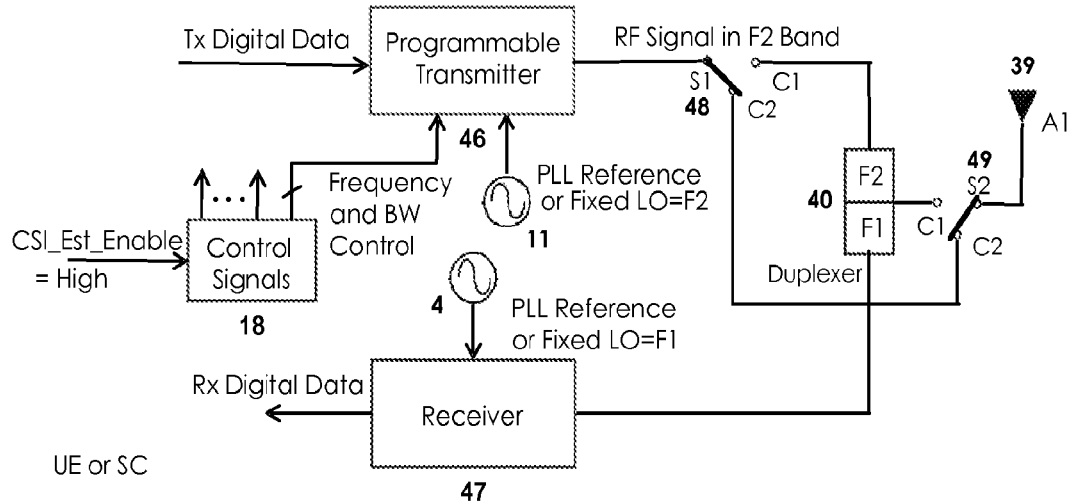

Modern radios can be made programmable so that their carrier frequency, passband bandwidth, and other radio parameters, can be changed using external control signals. FIG. 8 shows an embodiment of a first FDD apparatus that uses a programmable radio for the transmitting path for DL CSI estimation whereas the transmitting path functions as the normal FDD transmitting path in the F2 band when the CSI estimation enabling control signal is inactive, and the transmitting path changes to transmit pilot signals to a second FDD apparatus in the F1 band for DL CSI estimation when the CSI estimation enabling control signal is active. FIG. 8 assumes that the programmable transmitter 46 includes all the transmitting path components from DAC to PA and filters, and all the components can be made to function in the desired carrier frequency and bandwidth using external control settings. Frequency and Bandwidth (BW) control signal(s) change the carrier frequency and BW from the normal FDD transmission in F2 band to that of pilot signal used for CSI estimation in the F1 band. Switches S1 48 and S2 49 change the transmitting path and antenna connection based on the CSI estimation enabling control signal. FIG. 8a shows the setting when CSI_Est_Enable=Low and FIG. 8b shows the setting when CSI_Est_Enable=High. The normal receiver 47 in FIG. 8 can either be a programmable receiver or a fixed band receiver. In typical cases, both the transmitter and the receiver are in a single Integrated Circuit (IC) chip and both of them are programmable.

Figure 9A:
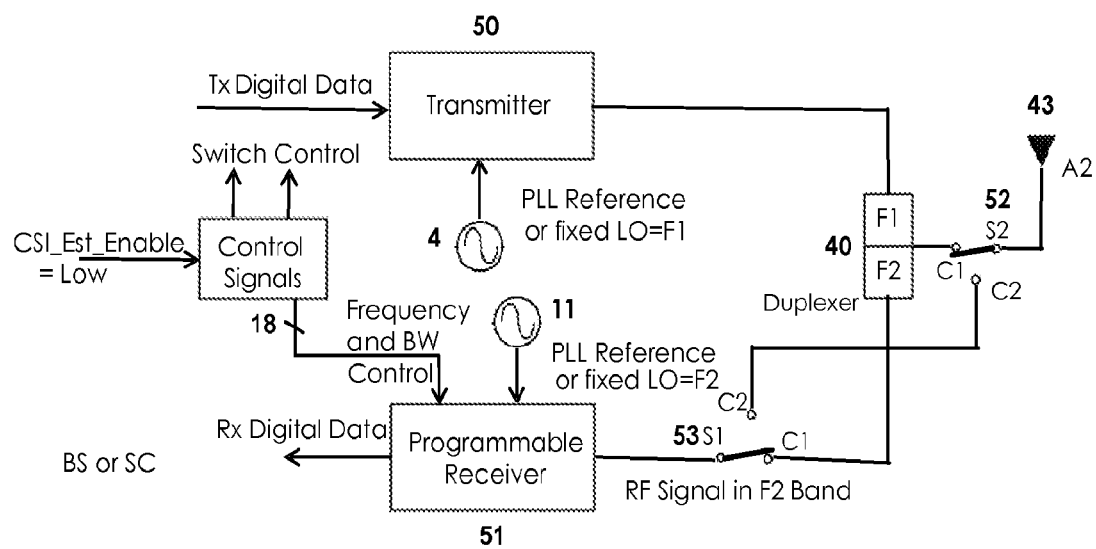
Figure 9B:
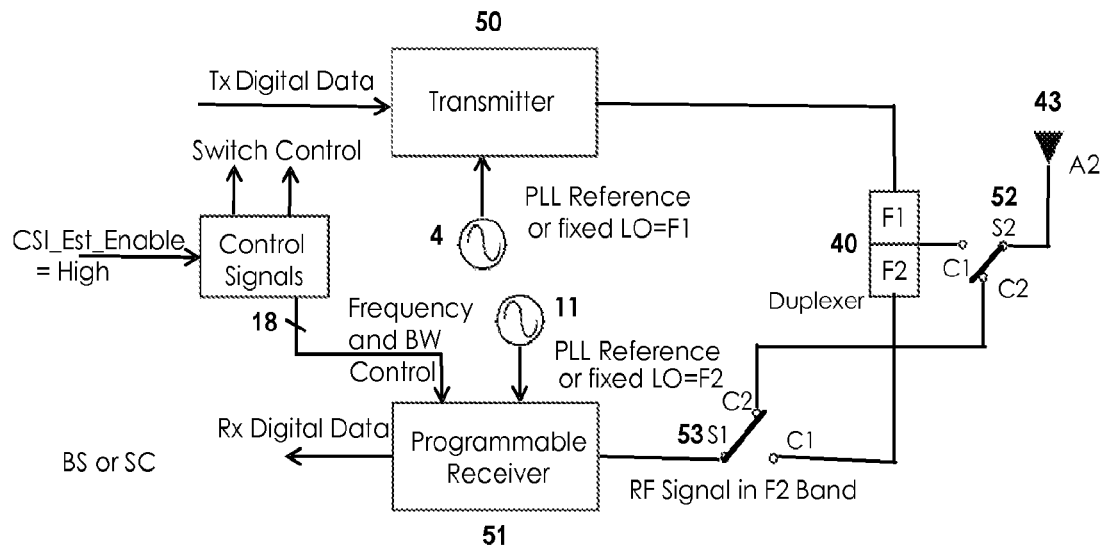

FIG. 9 shows an embodiment of a second FDD apparatus that uses a programmable radio for the receiving path for DL CSI estimation whereas the receiving path functions as the normal FDD receiving path in the F2 band when the CSI estimation enabling control signal is inactive, and the receiving path changes to receive pilot signals from a first FDD apparatus in the F1 band for DL CSI estimation when the CSI estimation enabling control signal is active. FIG. 9 assumes that the programmable receiver 51 includes all the receiving path components from LNA to ADC and filters, and all the components can be made to function in the desired carrier frequency and bandwidth using external control settings. Frequency and BW control signal(s) change the carrier frequency and BW from the normal FDD receiving in F2 band to that of pilot signal used for CSI estimation in the F1 band. Switches S1 53 and S2 52 change the receiving path and antenna connection based on the CSI estimation enabling control signal. FIG. 8a shows the setting when CSI_Est_Enable=Low and FIG. 8b shows the setting when CSI_Est_Enable=High. The normal transmitter 50 in FIG. 8 can either be a programmable transmitter or a fixed band transmitter. In typical cases, both the transmitter and the receiver are in a single IC chip and both of them are programmable.

FIGS. 8 and 9 use duplexers and single antenna shared by a transmitter and a receiver. The embodiments can be easily changed to embodiments with separate transmitting antenna and receiving antenna, with switch configurations similar to the embodiments described in earlier figures.

Depending on the components and circuit architecture chosen, an implementation of this invention may include a combination of the embodiments shown in FIGS. 2 to 9, or variations thereof.

For an FDD network using massive MIMO FDD, FIGS. 3, 5, 7 and 9 represent a transmitter and a receiver circuit in a single BS or SC, which is equipped with a plural of such transmitters and receivers. For CoMP in a FDD network, FIGS. 3, 5, 7 and 9 represent a transmitter and a receiver circuit in a BS or SC that is one of the transmitting points in the measurement set and the switching should be performed on each of transmitter path in all the transmitting points in the measurement set.

Note that for receiving BF in an FDD network with massive MIMO, or for joint receiving and processing in CoMP in an FDD network, a first FDD apparatus can send UL pilots using its normal transmitting path in the F2 frequency band and a second FDD apparatus can receive the pilots using its normal receiving path in the F2 frequency band for UL CSI estimation. No switching or changing of the circuit setting is required.

To summarize, in the DL CSI estimation state, the CSI estimation enabling control signal in one or more first FDD apparatus and a corresponding second FDD apparatus are both active. This enables the CSI of the DL from a second FDD apparatus with a large number of N transmitting antennas to one or more first FDD apparatus be estimated by having each first FDD apparatus transmitting pilot signals to the second FDD apparatus. This transforms the complexity of DL channel CSI estimation in a FDD wireless network from scaling linearly with a large number N to scaling linearly with a much smaller number K, the number of first FDD apparatus (or number of receiving antennas on all first FDD apparatus), and eliminates the need of feedback of DL CSI using the UL. The embodiments transform the circuits in FDD apparatus so that channel reciprocity is used to reduce the FDD DL CSI estimation complexity to be similar to the TDD channel CSI estimation complexity. This is significant because it makes massive MU-MIMO practical for FDD wireless networks.

Similar to the TDD mode, in the switched FDD mode (when all the switches are in the C2 position), only the over the air portion of the channel is reciprocal. In the switched FDD mode, the transmitting chain used to transmit the pilot signal and the receiving chain used to receive the pilot signal are different from the transmitting and receiving chains for the actual data transmission. The difference and parameters of the actual transmitting and receiving paths can be accounted through characterization or measurements of the hardware (the results of which may be stored in a memory), or estimated using more than one known but different pilot signals.

Figure 10A:
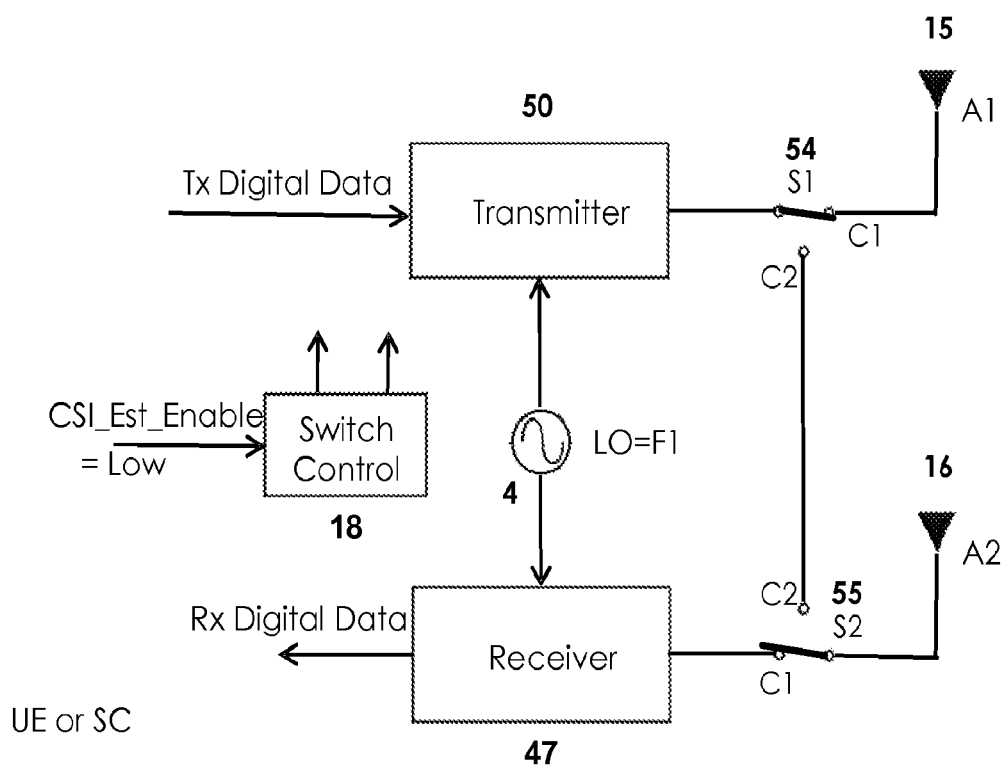
Figure 10B:
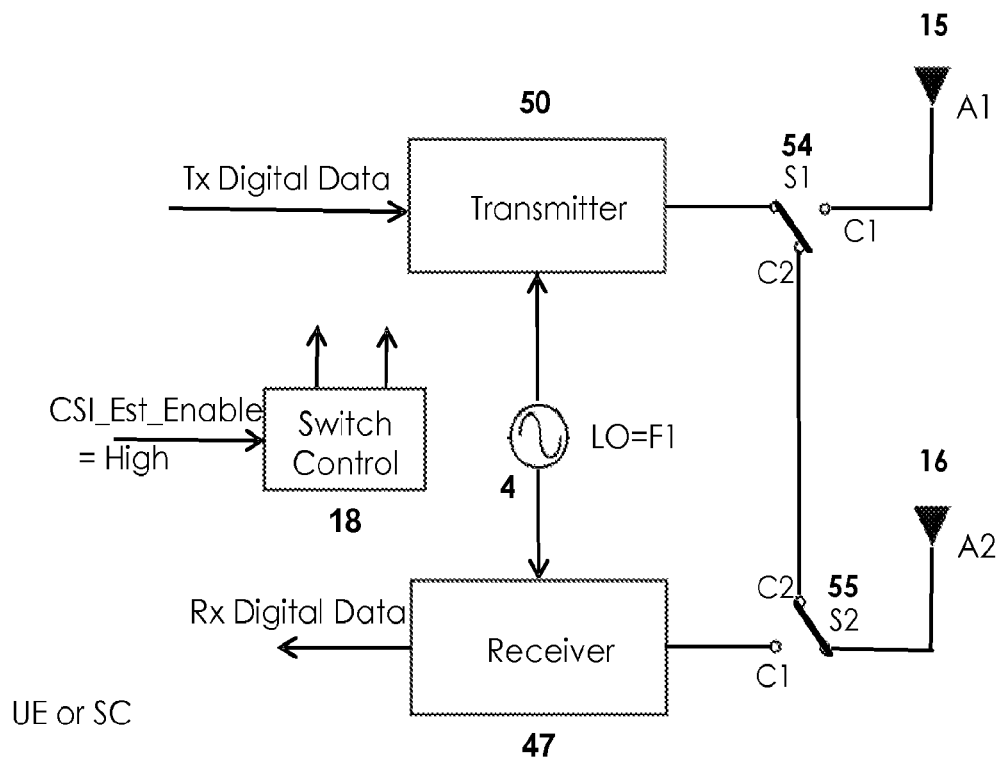
Figure 11A:
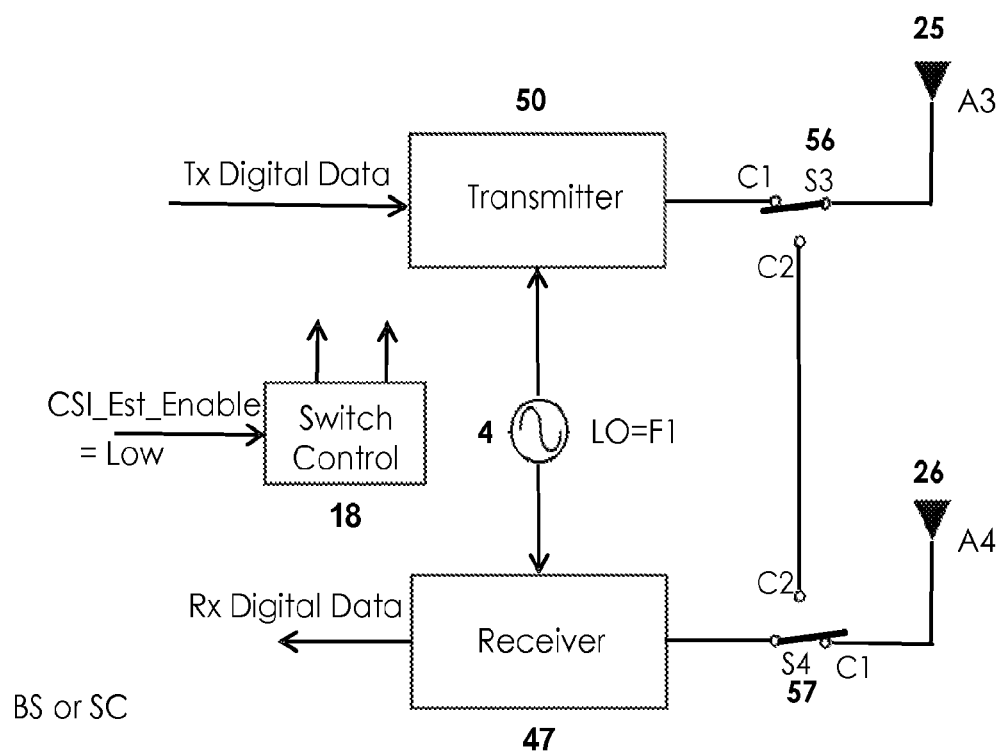
Figure 11B:
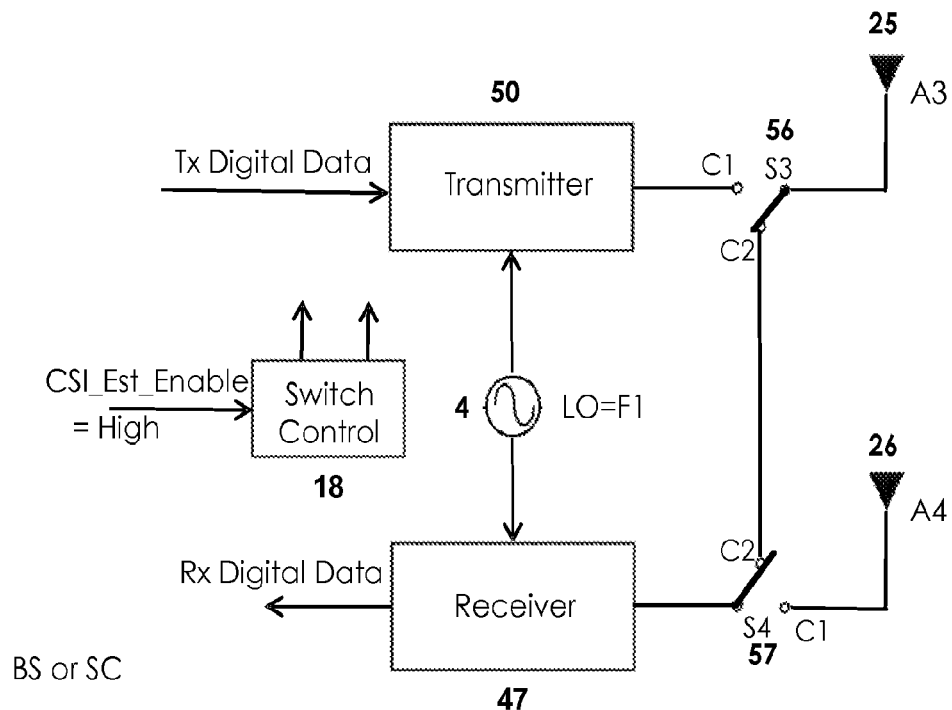

The above embodiments are not only useful for a FDD wireless network. They are also useful for DL CSI estimation in a TDD network when a TDD apparatus uses separate transmitting antenna and receiving antenna. One embodiment for a first TDD apparatus is shown in FIG. 10 for a UE communicating wirelessly with a BS or SC, or a SC communicating wirelessly with a BS. When the DL CSI estimation enabling control signal is inactive, e.g., when CSI_Est_Enable=Low, as shown in FIG. 10a, the switches S1 54 and S2 55 are in the C1 position, and the first TDD apparatus functions in a normal TDD mode, with transmitting signals emitting from antenna A1 15 and receiving signals picked up by antenna A2 16. When the DL CSI estimation enabling control signal is active, e.g., when CSI_Est_Enable=High, as shown in FIG. 10b, the switches S1 54 and S2 55 are changed to connect to the C2 position, which disconnects the receiving path and connects the transmitting signal to antenna A2 16 instead. Pilot signal for DL CSI estimation can then be transmitted out of antenna A2 16. Another embodiment for a second TDD apparatus is shown in FIG. 11 for a BS communicating wirelessly with a UE or SC, or a SC communicating wirelessly with a UE. When the DL CSI estimation enabling control signal is inactive, e.g., when CSI_Est_Enable=Low, as shown in FIG. 11a, the switches S3 56 and S4 57 are in the C1 position, and the second TDD apparatus functions in a normal TDD mode, with transmitting signals emitting from antenna A3 25 and receiving signals picked up by antenna A4 26. When the DL CSI estimation enabling control signal is active, e.g., when CSI_Est_Enable=High, as shown in FIG. 11b, the switches S3 56 and S4 57 are changed to connect to the C2 position, which disconnects the transmitting path and connects the receiving path to antenna A3 25 instead. Pilot signal for DL CSI estimation transmitted out of antenna A2 16 in FIG. 10b is then received by antenna A3 25 in FIG. 11b. Since in normal TDD DL, transmitting signal emits out of antenna A3 25 (FIG. 11a) is received by antenna A2 16 (FIG. 10a), i.e., the channel is from A3 25 to A2 16, the pilot signal channel from A2 16 to A3 25 (as shown in FIGS. 10b and 11b) is reciprocal to the A3 25 to A2 16 channel. Note that only the over the air portion of the two channels are reciprocal, and the transmitting path in FIG. 10b used to transmit the pilot signal and the receiving path in FIG. 11b used to receive the pilot signal are different from the transmitting and receiving paths for the actual data transmission as shown in FIGS. 10a and 11a. The difference and parameters of the actual transmitting and receiving paths can be accounted through characterization or measurements of the hardware (the results of which may be stored in a memory), or estimated using more than one known but different pilot signals.

Some of the assumptions or simplifications in the above embodiments are listed below. They are used for the purpose of avoiding clutter in the figures and simplified illustrations, and are in no way limiting the scope of this invention. A person skilled in the art can easily generalize to include the following and other considerations based on the principles of the embodiments presented in this invention.

C1 or C2 should be properly terminated when they are not connected, either to the ground, high impedance/isolation, or matched impedance, as appropriate.

In FIGS. 2 to 11, the normal transmitting and receiving paths in a first FDD or TDD apparatus and the normal transmitting and receiving paths in a second FDD or TDD apparatus are not used when the CSI estimation enabling control signal is active. There are a plural of options in how to handle the normal radio paths when a FDD apparatus is in the DL CSI estimation mode and the normal radio path is not used, including disconnecting its LO, turning off its power supply or disconnecting its antenna. These are not shown in the figures to avoid clutter in the illustration. Alternatively, in one embodiment, the normal transmitting and receiving paths in a first FDD apparatus and in a second FDD apparatus may be paired up for data or control signaling in the F2 band, either in the UL or DL direction, while the F1 band is used in the UL direction to send pilot or test signals for DL CSI estimation when the CSI estimation enabling control signal is active. This is doable because the two bands are not overlapping. This is also possible for the TDD embodiment if the TDD apparatus are equipped with circuits and processing mechanisms that support single channel full duplexing operation, i.e., being able to transmit and receive in the same frequency channel at the same time.

Some of embodiments assumed that different LPFs are used in the normal FDD path and the DL CSI estimation path, but for a direct conversion system, the LPFs can be the same if the bandwidths of the passbands are the same for DL and UL.

All figures show a pair of transmitter and receiver to illustrate the embodiments, but the embodiments can be easily generalized to an FDD or TDD apparatus with multiple transmitters and multiple receivers by duplicating the embodiments shown in the figures. Furthermore, the embodiments are not limited to apparatus with the same number of transmitters and receivers. On a first FDD or TDD apparatus, if there are $N_t$ transmitters and $N_r$ receivers, and $N_t < N_r$, a transmitting path when CSI_Est_Enable=High can be connected to one receiving antenna at time slot 1, and connected to another receiving antenna at time slot 2 and so on so that pilot signals can be transmitted out of each and every normal receiving antenna. On a second FDD or TDD apparatus, if there are $N_t$ transmitters and $N_r$ receivers, and $N_t > N_r$, a receiving path when CSI_Est_Enable=High can be connected to one transmitting antenna at time slot 1, and connected to another transmitting antenna at time slot 2 and so on so that pilot signals transmitted by a first FDD or TDD apparatus can be received by each and every normal transmitting antenna.

Figure 12:
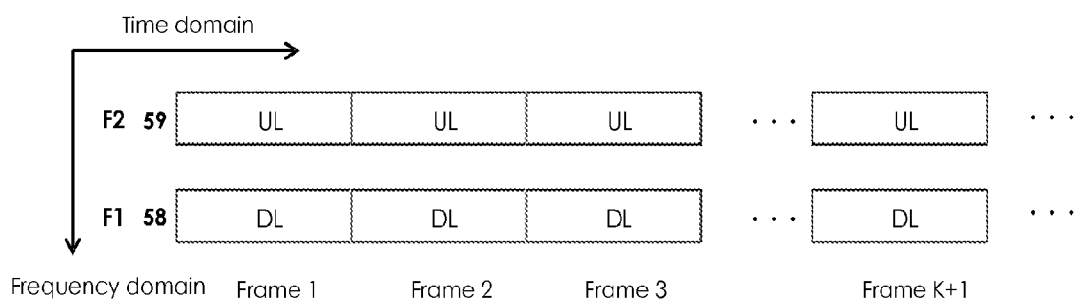
Figure 13:
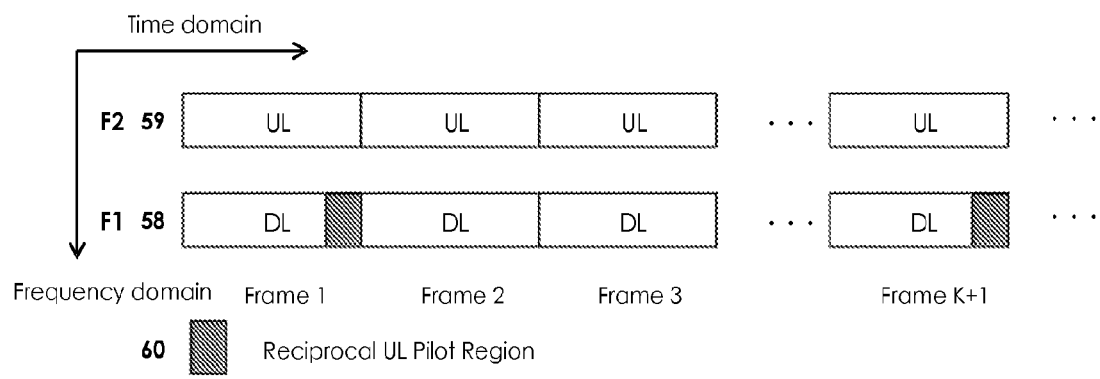
Figure 14:
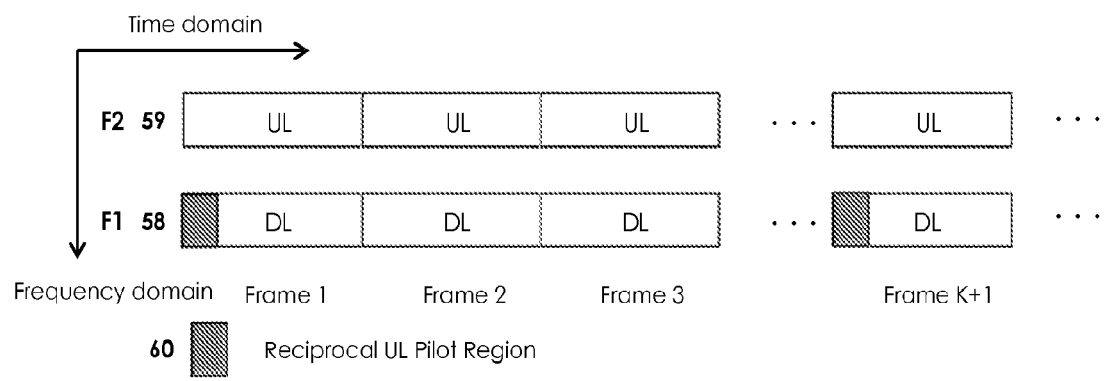

Another embodiment of this invention is a radio resource frame structure that can be used to acquire the DL CSI through the reciprocity of wireless channel in FDD wireless networks. In this embodiment, a time slot of the radio resource in the first frequency band (F1) is used for transmitting pilot or test signal in the uplink direction for DL CSI acquisition. This time slot is referred to as the reciprocal UL pilot region (RULPR) 60 in the radio frame. A radio frame is defined as several consecutive symbols in time domain over the bandwidth of the frequency band. FIG. 12 illustrates the traditional frame structure of FDD wireless networks where all of the radio resource in the first frequency band F1 58 is used for DL while all the radio resource in the second frequency band F2 59 is used for UL. The RULPR 60 may be located periodically or according to some predefined pattern in the radio frame, e.g., every K frames or the index of the frame including the RULPR 60 satisfies i=f BS Identification (BSID), where BSID represents the identity of the BS. The RULPR 60 may occupy the first or last several one or more consecutive symbols of a frame, or other symbol locations in a frame. FIG. 13 illustrates the case where the RULPR 60 is at the end of a frame in the F1 band 58, i.e., the RULPR 60 occupies the last one or more symbols. FIG. 14 illustrates the case where the RULPR 60 is at the beginning of a frame in the F1 band 58, i.e., the RULPR 60 occupies the first one or more symbols. Alternatively, the RULPR 60 may be a time slot inserted between frames.

At the time slot of RULPR 60, the F2 band 59 may be either idle or used for DL or UL data or control signals, depending on how the normal transmitting and receiving paths in the first and second FDD apparatuses are connected or configured by control signals and/or switches.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A method for a BS to acquire DL CSI in a FDD wireless network comprising a second FDD apparatus who normally receives UL signals in frequency band F2 from and sends DL signals in frequency band F1 to a first FDD apparatus whose DL CSI is to be estimated; a CSI estimation enable control signal and a set of switches controlled by the CSI estimation enable control signal in the first FDD apparatus; and upon the CSI estimation enable control signal becoming active, changing the connections of the set of switches so that the transmitting frequency band of a transmitter in the first FDD apparatus is changed from the normal transmitting frequency band F2 to the normal receiving frequency band F1 and the transmitting signal is transmitted out of a normal receiving antenna instead of a normal transmitting antenna; and correspondingly, a second CSI estimation enable control signal and a second set of switches controlled by the CSI estimation enable control signal in the second FDD apparatus; and upon the CSI estimation enable control signal becoming active, changing the connections of the set of switches so that the receiving frequency band of a receiver in the second FDD apparatus is changed from the normal receiving frequency band F2 to the normal transmitting frequency band F1 and the receiving signal is received from a normal transmitting antenna instead of a normal receiving antenna.

2. The method in claim 1 further comprising transmitting one or more pilot signals using the newly configured transmit path in the first FDD apparatus in the frequency band F1.

3. The method in claim 2 further comprising receiving the one or more pilot signals using the newly configured receiving path in the second FDD apparatus in the frequency band F1.

4. The method in claim 3 further comprising using the received one or more pilot signals in the frequency band F1 to estimate the UL channel from the first FDD apparatus to the second FDD apparatus in the frequency band F1.

5. The method in claim 4 further comprising using the estimation of the UL channel and calibration data of the hardware dependent components of the DL and UL channels to obtain an estimate of the DL channel from the second FDD apparatus to the first FDD apparatus in the frequency band F1 based on reciprocity of the over the air channel.

6. The method in claim 1 further comprising the normal receiving antenna and normal transmitting antenna in the first FDD apparatus are the same antenna.

7. The method in claim 1 further comprising the normal receiving antenna and normal transmitting antenna in the second FDD apparatus are the same antenna.

8. A circuit in a first FDD apparatus for estimating DL CSI in a FDD wireless network comprising generator of a CSI estimation enable control signal and a set of switches controlled by the CSI estimation enable control signal in the first FDD apparatus; and upon the CSI estimation enable control signal becoming active, changing the connections of the set of switches so that the transmitting frequency band of a transmitter in the first FDD apparatus is changed from the normal transmitting frequency band F2 to the normal receiving frequency band F1 and the transmitting signal is transmitted out of a normal receiving antenna instead of a normal transmitting antenna.

9. The circuit in claim 8 further comprising transmitting to one or more second FDD apparatus one or more pilot signals using the newly configured transmit path in the first FDD apparatus in the frequency band F1.

10. The circuit in claim 8 further comprising the normal receiving antenna and normal transmitting antenna in the first FDD apparatus are the same antenna.

11. A circuit in a second FDD apparatus for estimating DL CSI in a FDD wireless network comprising generator of a CSI estimation enable control signal and a set of switches controlled by the CSI estimation enable control signal in the second FDD apparatus; and upon the CSI estimation enable control signal becoming active, changing the connections of the set of switches so that the receiving frequency band of a receiver in the second FDD apparatus is changed from the normal receiving frequency band F2 to the normal transmitting frequency band F1 and the receiving signal is received from a normal transmitting antenna instead of a normal receiving antenna.

12. The circuit in claim 11 further comprising the normal receiving antenna and normal transmitting antenna in the second FDD apparatus are the same antenna.

13. The circuit in claim 11 further comprising receiving one or more pilot signals sent by a first FDD apparatus using the newly configured receiving path in the second FDD apparatus in the frequency band F1.

14. The circuit in claim 13 further comprising using the received one or more pilot signals in the frequency band F1 to estimate the UL channel from the first FDD apparatus to the second FDD apparatus in the frequency band F1.

15. The circuit in claim 14 further comprising using the estimation of the UL channel and calibration data of the hardware dependent components of the DL and UL channels to obtain an estimate of the DL channel from the second FDD apparatus to the first FDD apparatus in the frequency band F1 based on reciprocity of the over the air channel.

16. A method for acquiring the downlink channel information through the reciprocity of wireless channel in a FDD wireless network comprising reserving a time slot in the DL radio resource frame structure in the first frequency band (F1) for one or more UEs to transmit pilot or test signal(s) in the UL direction; one or more UEs using the reserved time slot to transmit pilot or test signal(s) in the first frequency band F1; a BS receiving and using the pilot or test signal(s) to estimate the DL channel information, and performing downlink MIMO beamforming using the estimate of the DL channel information.

* * * * *